March 22, 1955  F. C. MOCK ET AL  2,704,516

ROTARY PUMP

Filed June 17, 1940  2 Sheets-Sheet 1

INVENTORS
FRANK C. MOCK
ROBERT H. PETERSON
BY
A. R. McCrady
ATTORNEY

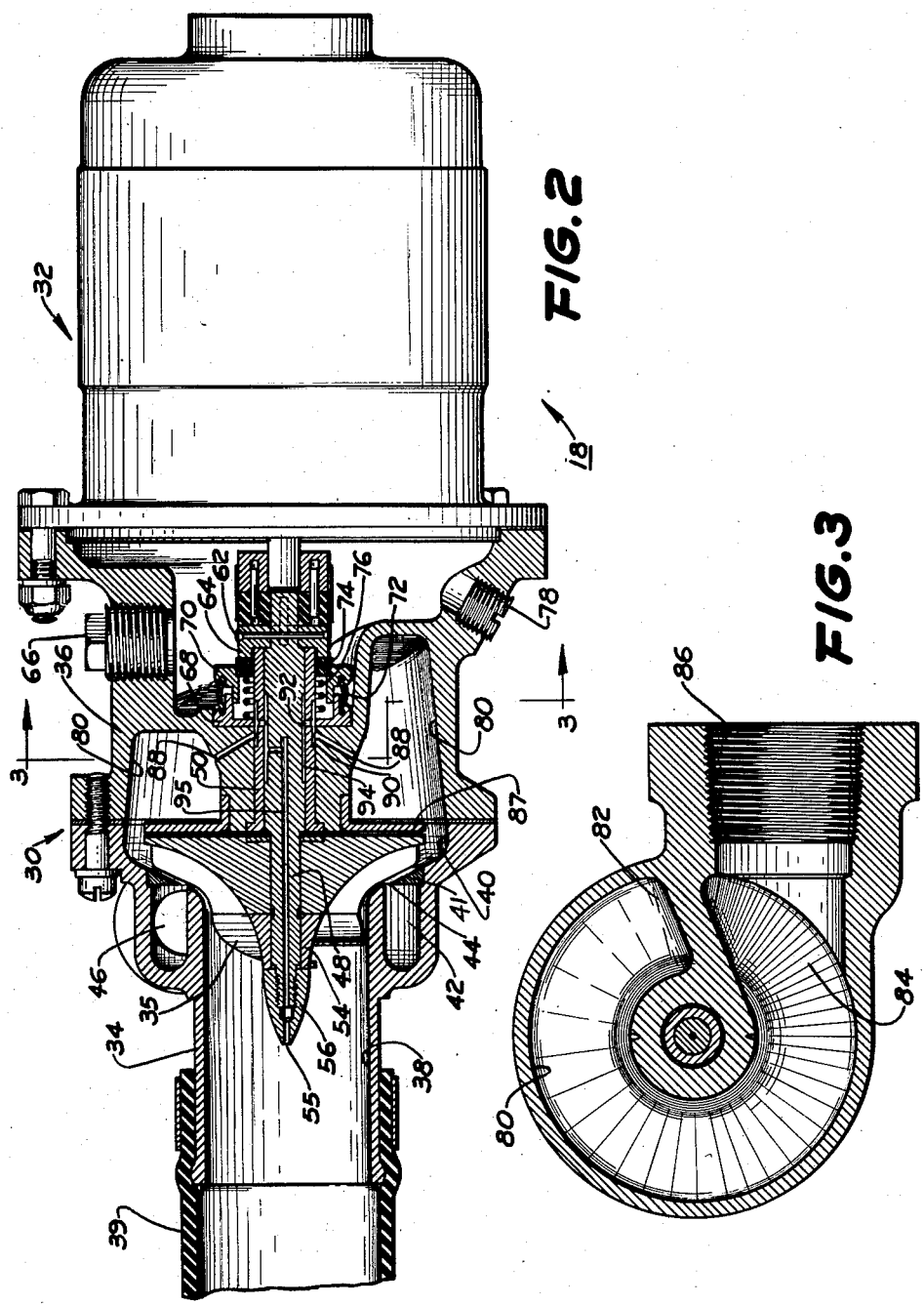

United States Patent Office 2,704,516
Patented Mar. 22, 1955

2,704,516

ROTARY PUMP

Frank C. Mock and Robert H. Peterson, South Bend, Ind., assignors to Bendix Aviation Corporation, South Bend, Ind., a corporation of Delaware Application June 17, 1940, Serial No. 340,968

6 Claims. (Cl. 103—88)

This invention relates to fluid pumps and more particularly to a booster fuel pump for aircraft.

In the construction of airplane fuel systems, it is customary to place a fuel pump on the engine where it may be driven by a rotating part. The inlet of the pump is connected to fuel tanks, and the outlet is connected to the carburetor, which meters the fuel into the incoming air for the engine. Also it is customary to place the fuel tanks in the wings of the aircraft. Since many modern airplanes are of the low wing monoplane type, this relation of fuel tank to the fuel pump necessitates elevating the fuel from the tanks to the fuel pump, because the engine is at a point above the wing. In the past it has been customary to secure this rise in fuel by a suction of the intake of the fuel pump, causing atmospheric pressure to act on the fuel to raise it to the desired engine level.

The modern trend toward operating aircraft at high altitudes has rendered prior fuel systems inadequate. If the fuel used at high altitudes were always at temperatures corresponding to the air temperature, there would be relatively little trouble with the fuel systems of the prior art. However, airplanes are loaded with gasoline at sea level temperatures, and this fuel takes a long time to cool to the cooler temperature usually found at higher altitudes. This results in having fuel at sea level temperatures at high altitude, where the fuel is very near, or at, the boiling point of the more volatile aviation fuels such as gasoline. The resistance offered by valves and feed lines, together with the necessity of elevating the fuel from the wing to the airplane motor causes a substantial drop in pressure from the gasoline tank to the suction inlet of the fuel pump which may be as high as two or three pounds per square inch. This drop in pressure in a fuel which is already near the vaporization point causes vaporization of the fuel in the fuel line, or cavitation at the fuel pump inlet, or both. In either case the fuel system is rendered useless and cannot be operated until the aircraft descends again to lower altitudes having a higher pressure.

Our invention is designed to eliminate these deficiencies of prior fuel systems by providing means adjacent the fuel tank to place the fuel under pressure sufficient to prevent vaporization or boiling in the fuel lines. This pressure means is a pump of novel construction particularly adapted to the pumping of volatile fuels and will be more particularly described herein.

It is therefore an object of our invention to provide means adjacent to the fuel tank to place the fuel under pressure so that there will be no boiling or cavitation in the system from the tank to the fuel pump.

Another object of the invention is to provide a novel type booster fluid pump particularly adapted for the pumping of volatile fuels.

A further object is to provide a booster fuel pump wherein any vapor may be vented therefrom should it occur.

Still another object of the invention is to provide a self-priming fuel pump.

Other objects of the invention include the provision of a booster fuel pump of large capacity having relatively small bulk, and the provision of a pump that may be driven by a constant speed motor and give the desired result.

Other objects and features of the invention will appear from the following description and claims which may best be understood when considered in connection with the following drawings, in which:

Figure 2 is an assembly of a booster fuel pump and its motor, shown in the system of Figure 1 at 18;

Figure 3 is a sectional view of the diffuser ring of the fuel pump taken along the line 3—3 of Figure 2.

Figure 1:
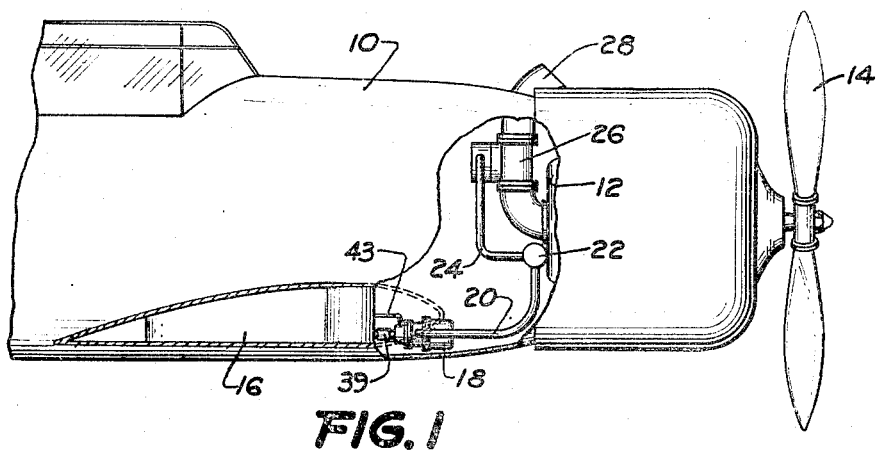
Figure 1 is a view in elevation of an airplane having parts broken away to show the fuel system.

The invention is shown generally in Figure 1. It is there applied to an airplane 10 having a motor 12 which drives a propeller 14. Fuel is stored in a fuel tank 16 located in the airplane wing, and is pumped by the booster unit 18 through a conduit 20 to a fuel pump 22. Fuel pump 22 delivers the fuel under the desired pressure through line 24 to a carburetor 26. The carburetor 26 may be of the type wherein fuel is injected under pressure into the air stream, or it may be of any other type. Air for combustion enters the aircraft through scoop 28 which delivers it to the carburetor 26 where it is mixed with fuel and then delivered to the motor 12.

The booster pump unit 18 is shown in section in Figure 2. The unit 18 comprises a fuel pump 30 and a driving motor 32 which may be electric, hydraulic, or of any other suitable type. The fuel pump is of the screw impeller type, wherein initial axial movement of the fluid is obtained by a screw and the pressure stage is obtained by a centrifugal rotor. The pump is divided into three parts, an inlet section 34, a rotor 35, and a pressure and outlet section 36. The inlet section 34 has an inlet passage 38 which widens axially at 40 to receive the centrifugal impeller of rotor 35. Just beyond the beginning of the widening of the inlet passage is a throat ring 41 lapping the rotor 35 and forming a circumferential opening 44 for an annular vent 42 having an outlet 46.

The pressure and outlet part 36 of the pump 30 is shown in Figures 2 and 3. A diffuser ring 80 is formed in the forward end, and acts as an accumulator to convert velocity head of fluid into a pressure head and deliver the fluid to an outlet 86. The diffuser ring 80 is of variable depth spiraling from a shallow beginning point 82 (Figure 3) to a deeper outlet part 84. The spiral of the diffuser ring from the shallow to deep part is in the direction of rotation of the rotor element 35 to aid in driving the fluid to the outlet 86. This variation in depth from beginning to outlet causes a smooth flow of fluid from the diffuser ring 80 to the outlet 86. Any agitation of fuel tends to heat it up and cause boiling. An annular plate 87 separates the diffuser ring 80 from the rotor 35 to keep agitation of fuel at a minimum. By having the diffuser ring back of, and not much greater in circumference than the rotor, the bulk of the pump is at a minimum.

The central portion of part 36 retains a bearing 50 wherein a shaft 48 rotates. The rotor element 35 is fixed to the forward end of shaft 48, and a coupling with motor 32 is fixed at the other. The coupling is a pin connection, the pin 62 connecting a resiliently mounted driving collar 64 to the shaft 48. The pin is inserted and the assembly completed by means of an assembly hole normally closed by plug 66. A plug 78 in the lower part of section 36 closes a drain hole.

A seal is placed between the driving collar 64 and the section 36, to seal off the shaft 48 from the motor 32. This seal is of a common type, an outer collar 68 being secured to part 36, and an inner telescoping collar 70 being flexibly attached thereto by a leak-proof band 72. The collar 70 retains a carbon ring 74 which makes a rotating contact with driving collar 64. A compression spring 76 keeps carbon ring 74 in tight contact with driving collar 64.

The seal and bearing 50 are kept cool by circulating fuel through them. High pressure fuel in the diffuser ring 80 enters passages 88 to an annular recess 90 in bearing 50, which communicates with the seal. Radial holes 92 communicate recess 90 with a circumferential recess 94 on shaft 48. An axial passage 95 in shaft 48 communicates recess 94 with the inlet 38 through a hole 55 in nose piece 56 of the rotor element. Through these passages, high pressure fluid from the diffuser ring 80 enters the seal and bearing 50, cooling them and discharging to the low pressure inlet 38.

Figure 4:
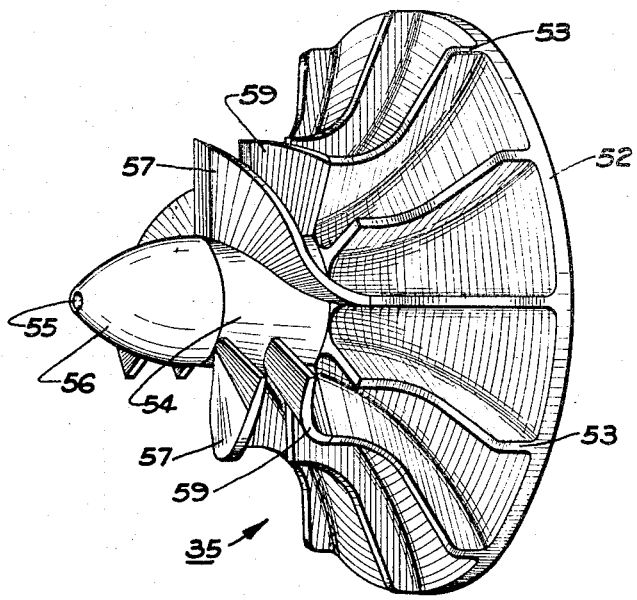
Figure 4 is an isometric view of the rotor of the fuel pump shown in Figure 2.

The rotor element 35 is shown in detail in Figure 4. It is composed of three sections, a streamline nose section 56, a screw portion 54, and a centrifugal impeller section 52. The nose 56 is designed to streamline the fluid flow of the screw element 54 and reduce turbulence to a minimum. The screw portion 54 retains a plurality of full screws or blades 57, and a plurality of half screws or blades 59. The half screws are used to accelerate fuel in the area intermediate the full screws. These screws may be of constant pitch or variable pitch. However, it has been found that variable pitch screws are the most satisfactory, and we prefer to give the leading edge a small angle of incidence and gradually increase the pitch until the screws terminate in longitudinal portions. By using a small angle of incidence, only a small amount of fuel is caught with every rotation, and when fuel is under a small hydrostatic head, this will prevent cavitation. Causing the pitch to increase until it is longitudinal, gives the fuel its greatest axial acceleration as well as rotative acceleration. Rotative acceleration will cause the fuel to move smoothly into the impeller unit 52. To further aid in this smooth flow of fluid to the impeller unit, the ends of the screws 57 and 59 are matched to raised ribs 53 on the impeller unit 52. The screw unit 54 fits closely in the inlet 38 of the pump 30 so that there will be a minimum amount of slip.

The centrifugal impeller unit 52 is a cone-shaped rotor provided with raised radial ribs or vanes 53. The impeller unit is the pressure stage of the pump, the ribs 53 restraining the fuel while it is whirled and given velocity due to centrifugal force. Fuel is directed into these ribs 53 from the screw 54 and is whirled by the impeller unit and directed to the diffuser ring 80 where the velocity head of the fuel is converted into pressure head, except for enough to move the fluid to the outlet 86.

The installation of the fuel pump is shown best in Figure 1. The inlet 38 is connected very closely to the bottom of the fuel tank by coupling 39. The vent ring 42 is also connected to the fuel tank 16 by a tube 43. It is often desirable to have only one entrance to a fuel tank, and where this is required, the vent tube 43 may pass through the coupling 39 and enter the tank through the same opening. The booster unit pumps fuel through tube 20 to fuel pump 22, and from there it is pumped to the carburetor 26.

The operation of the fuel system is as follows. When the airplane engine 12 is started, the motor 32 is also started causing rotation of the rotor element 35 of the pump. The fuel in the coupling 39 is under a small hydrostatic pressure from the gas tank 16 and is thus urged toward the rotor 35. Screw blades 57 and 59 of the rotor slice into the fuel, and accelerate it axially as the pitch of the screw increases. The small pitch of the leading edge of the screws 57 insures that but a small amount of fluid will enter the screw at each rotation thus allowing the hydrostatic head of the fuel to force enough fuel against the screws to prevent cavitation. If the pitch of the leading edge of the screw were great, so much fluid would be removed with every rotation that cavitation would probably result.

The fuel, axially accelerated by the screws 57, is driven into the vanes 53 of the impeller unit 52, and given an outward movement. Fluid thus driven into the vanes 53 already has a rotative acceleration as well as an axial acceleration due to the screws 57. Because of this rotative acceleration, there is no violent agitation of the fuel as it enters the impeller stage of the pump, and agitation of the fuel is kept at a minimum insuring that there will be no boiling or cavitation. As shown in Figure 2, the fuel accelerated radially by the impeller blades 53 is driven into the diffuser ring 80 where the velocity head of the fuel is converted into a pressure head. The diffuser ring is of variable depth and, as shown in Figures 2 and 3, being shallow at the beginning portion 82 and deeper at the outlet portion 84. Fuel is delivered through line 20 to the engine fuel pump 22, where it is placed under operating pressure and driven through the line 24 to the carburetor 26. Fuel is there mixed with the air entering through scoop 26, and the fuel air mixture is delivered to the engine 12 to form a combustible source of power.

The vent ring 42 has two functions. When starting the pump 18 it acts as a priming device, causing recirculation from the pumping stage back to the tank when the fuel is accelerated by the screws 57. In this manner fuel is supplied to the impeller stage of the pump where it is radially accelerated and the complete pumping cycle can be completed. The vent passage 46 also acts as a vent. Should bubbles be formed in the fuel as it passes through the screw stage of the rotor, these will find their way to the vent 46 as the heavier fuel is being thrown against the bottom of the grooves of rotor 52 by the axial acceleration of the fuel. The vent is placed intermediate the screw and the impeller stage because the vapor, if any, will be caused by the very slight agitation of the screw. Having once passed the screw stage of the rotor, the pressure of the fluid will be increased thus changing the equilibrium point of any fuel and preventing boiling. By eliminating fuel and air bubbles before they get to the end of the impeller stage, vapor is kept out of the fuel system, insuring uniform and consistent operation of the fuel supply system.

A feature of the pump is the circulation of fuel through the bearings and the seal to keep them cool and lubricated. Fuel in the diffuser ring 80 being under pressure enters the passages 88 and from there flows into the annular recess 90 of bearing 50, through radial holes 92 in bearing 50 to an annular recess 94 on shaft 48. In this way, fuel is adjacent the bearing surfaces of shaft 48 and cools them. Fuel from annular recess 90 also enters the seal cavity where it is in contact with the carbon ring 74 forming the tight joint. In this manner, the sealing ring is kept cool. Circulation is established by connecting these passages to the low pressure side of the pump. This is done by providing the shaft 48 with a passage 95 connected with the inlet side of the pump through a passage 55 and nose cap 56.

Although the booster unit 18 has been described with relation to an aircraft fuel system, it is not limited to that use. It may be used anywhere, for the movement of any type of fluid. However, it is particularly adapted to the pumping of volatile liquids. The drawings are for purposes of illustration only and do not define or limit the invention, nor is our invention limited in any other way except by the terms of the following claims.

We claim:

1. In a fuel supplying system for an internal combustion engine, a source of fuel including a reservoir, a two stage pump connected thereto comprising a screw stage and a centrifugal impeller stage, said screw stage being formed of blades of changing pitch having a small pitch at the leading edge and a relatively large pitch at the trailing portion and shortened screw blades between said first-mentioned blades, said second stage comprising an impeller having raised ribs which match the trailing portions of the screw blades, a vent means in said pump including an annular chamber and an annular entrance thereto between said screw stage and the outlet of said second stage and in communication with the interstage portion of said pump, a port in said chamber, and a conduit from said port to said source to form a priming circuit for the pump.

2. In a fuel supplying system for an internal combustion engine, a source of fuel including a reservoir, a two stage pump connected thereto comprising a screw stage and a centrifugal impeller stage, said screw stage being formed of blades of changing pitch having a small pitch at the leading edge and a relatively large pitch at the trailing portion and shortened screw blades between said first-mentioned blades, said second stage comprising an impeller having raised ribs which match the trailing portions of the screw blades and ribs spaced intermediate the ribs matching the trailing portions of the screw blades, a vent means in said pump including an annular chamber and an annular entrance thereto between said screw stage and the outlet of said second stage and in communication with the interstage portion of said pump, a port in said chamber, and a conduit from said port to said source to form a priming circuit for the pump.

3. In a pump for supplying liquids subject to cavitation, a casing, a shaft journaled in bearings in said casing, a two stage pressure producing member connected to said shaft having a first stage consisting of a screw having blades of increasing pitch from the leading edges to the trailing portions and having a second stage consisting of radial vanes which match the trailing portions of the screw stage, an inlet for entrance of fluid to the screw stage, an outlet chamber for fluid leaving the second stage, means for cooling said shaft and bearing comprising a plurality of ducts from the outlet chamber to the bearing and shaft, and a conduit in said shaft connecting said ducts and having an opening in the inlet anterior to the screw stage, and gaseous fluid venting means between said inlet and said outlet chamber to insure the movement of cooling liquid at all times in said bearing cooling means.

4. In a pump for supplying liquids subject to cavitation, a casing, a shaft journaled in bearings in said casing, a two stage pressure producing rotating member connected to said shaft having a screw stage and a centrifugal impeller stage, an inlet for entrance of fluid to the screw stage, an outlet chamber for fluid leaving the centrifugal impeller stage, means for cooling said shaft and bearings comprising a plurality of ducts from the outlet chamber to the bearing and shaft, said means comprising also a conduit in said shaft connecting said ducts and having an opening in the inlet anterior to the screw stage, and gaseous fluid venting means between said inlet and said outlet chamber to insure the movement of cooling liquid at all times in said bearing cooling means.

5. In a pump for supplying liquids subject to cavitation, a casing, a journal in said casing, a shaft in said journal, a two stage pressure producing rotating member connected to said shaft consisting of a screw stage and a centrifugal impeller stage, an outlet chamber for fluid leaving the centrifugal impeller stage, means for cooling said shaft and journal including a duct from the outlet chamber to said shaft, and a duct in said shaft leading to a point adjacent said screw stage, and gaseous fluid venting means between said point and said outlet chamber to insure the movement of cooling liquid at all times in said cooling means.

6. In a pump for supplying liquids subject to cavitation, a casing, a shaft journalled in a bearing in said casing having a two stage pressure producing rotatable member mounted thereon consisting of a screw stage and an impeller stage, an outlet chamber for fluid leaving the centrifugal impeller stage, means for cooling said shaft and said bearing including a duct from the outlet chamber to said bearing and shaft, and a duct in said shaft leading to a point adjacent said screw stage, and gaseous fluid venting means between said point and said outlet chamber to insure the movement of cooling liquid at all times in said cooling means.

References Cited in the file of this patent

UNITED STATES PATENTS

| | | |
|---|---|---|
| 494,890 | Rateau | Apr. 4, 1893 |
| 776,835 | Goth | Dec. 6, 1904 |
| 1,100,327 | Remington | June 16, 1914 |
| 1,274,507 | Bull | Aug. 6, 1918 |
| 1,345,895 | Seguin | July 6, 1920 |
| 1,717,969 | Goodner | June 18, 1929 |
| 1,797,455 | Vose | Mar. 24, 1931 |
| 1,799,590 | Kiefer | Apr. 7, 1931 |
| 1,842,577 | Bond | Jan. 26, 1932 |
| 1,881,554 | Heckert | Oct. 11, 1932 |
| 1,931,724 | Fageol | Oct. 24, 1933 |
| 1,983,131 | Hume | Dec. 4, 1934 |
| 2,018,639 | Dykeman | Oct. 22, 1935 |
| 2,157,089 | Storch | May 2, 1939 |
| 2,216,542 | Paige | Oct. 1, 1940 |
| 2,233,825 | Walsh | Mar. 4, 1941 |
| 2,259,361 | Vorkauf | Oct. 14, 1941 |
| 2,292,993 | Curtis | Aug. 11, 1942 |

FOREIGN PATENTS

| | | |
|---|---|---|
| 2,290 | Great Britain | 1853 |
| 16,500 | Denmark | Sept. 26, 1912 |
| 21,203 | Netherlands | Dec. 17, 1929 |
| 28,980 | Great Britain | 1911 |
| 86,315 | France | 1869 |
| 106,869 | Switzerland | 1924 |
| 336,977 | Great Britain | 1929 |
| 475,711 | Germany | May 2, 1929 |
| 517,377 | Germany | 1931 |
| 556,579 | Germany | 1932 |
| 573,029 | Germany | 1931 |
| 630,932 | Germany | June 9, 1936 |